Patented Jan. 2, 1940

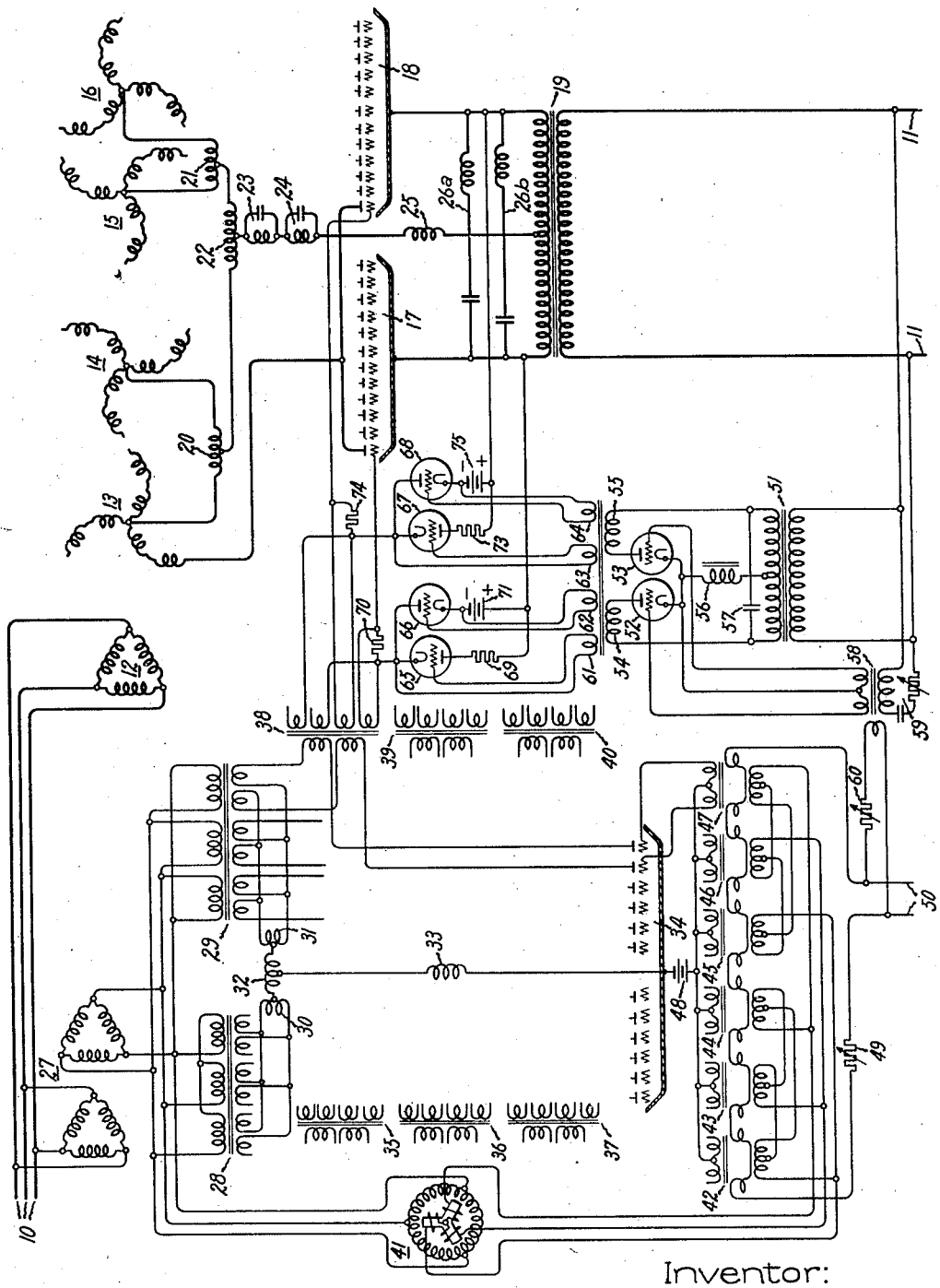

2,185,819

UNITED STATES PATENT OFFICE 2,185,819

ELECTRIC VALVE CONVERTING SYSTEM

August Schmidt, Jr., Niskayuna, N. Y., assignor to General Electric Company, a corporation of New York Application May 19, 1938, Serial No. 208,877

9 Claims. (Cl. 172—281)

My invention relates to electric valve converting systems for transferring energy between alternating current circuits of the same or different frequencies and more particularly to control circuits for such systems which operate between two alternating current circuits the frequency relation between which need not be expressed by an invariable ratio.

It is an object of my invention to provide an improved control circuit for an electric valve converting system operating between alternating current circuits of the same or different frequencies.

Another object of my invention is to provide an improved control circuit for electric valve converting systems operating between polyphase and single phase alternating current circuits of the same or different frequencies.

For a better understanding of my invention, together with other and further objects thereof, reference is had to the following description taken in connection with the accompanying drawing in which the single figure diagrammatically illustrates the application of my invention to a system for transmitting energy between a three-phase alternating current circuit and a single-phase alternating current circuit.

Referring more particularly to the drawing, there is shown a system for transmitting energy from a three-phase higher frequency alternating current supply circuit 10 to a single-phase lower frequency alternating current load circuit 11. This apparatus includes a transformer bank provided with a three-phase primary network 12 connected to the supply circuit 10 and four three-phase star connected secondary networks 13, 14, 15 and 16 which are interconnected by means of two groups of electric valves 17 and 18 with the primary windings of the output transformer 19, the secondary winding of which supplies the load circuit 11. The neutral points of the secondary windings 13 and 14 are interconnected by an inductor 20, and similarly the neutral points of the secondary windings 15 and 16 are interconnected by an inductor 21. The midpoints of these inductors 20 and 21 are interconnected by a third inductor 22, the midpoint of which is connected through a plurality of filter circuits 23 and 24 and a smoothing reactor 25 to the midpoint of the primary winding of the output transformer 19. The use of these filter circuits 23 and 24 permits a smaller smoothing inductor 25 to be employed in the direct current lead to the midpoint of the primary winding of the output transformer 19 since these filter circuits are tuned to the predominant harmonics of the output frequency thereby preventing these harmonics from being reflected back into the supply circuit. A plurality of filter circuits 26a and 26b may be connected across the primary winding of the transformer 19 to prevent undesired harmonics from appearing in the output circuit 11. Each of the extremities of the secondary windings 13, 14, 15 and 16 is connected to one of the anodes of each of the groups of electric valves 17 and 18 as indicated in the drawing by the connection to one of the terminals of the secondary winding 13. For purposes of simplicity in disclosure the remaining terminals of the secondary windings have not been shown connected but it will be apparent to those skilled in the art that each terminal of these secondary windings is provided with two arc discharge paths or valves, each one of which is in a different one of the groups of valves 17 and 18. It furthermore will be apparent that the valves represented in the groups of valves 17 and 18 may be any of the electric valves commonly known in the art although it is preferable to utilize those valves having an anode, a cathode and a control electrode contained within an envelope containing an ionizable medium. While single cathode multi-anode devices have been shown, a plurality of individual valves may be utilized, including the type having an anode, a cathode and a starting electrode. The various arc discharge paths or valves of the groups of valves 17 and 18 are rendered conductive in proper sequence by applying to the control electrodes substantially rectangular shaped alternating potentials having a frequency corresponding to the frequency of the supply circuit and these potentials are rendered alternately effective and ineffective in accordance with the frequency of the load circuit.

The control circuit includes an arrangement for producing substantially rectangular shaped alternating potentials and this is energized from the alternating current supply circuit 10 by means of a transformer 27 having a primary winding and a secondary winding. The secondary winding of this transformer 27 is connected to energize the primary windings of two transformers, the one transformer 28 having a star connected primary winding and the other transformer 29 having a delta connected primary winding. The individual phase windings of the primary windings of the transformers 28 and 29 are each provided with a pair of secondary windings, one winding of each pair being arranged in a different group of star connected secondary windings. The neutral points of the two groups of secondary windings of the transformer 28 are interconnected by an inductor 30, and similarly the neutral points of the two groups of secondary windings of the transformer 29 are interconnected by an inductor 31. The midpoints of these inductors 30 and 31 are interconnected by means of an inductor 32, the midpoint of which is connected through a smoothing reactor 33 to the common cathode of a group of arc discharge paths or valves 34. Each of the outer extremities of the secondary windings of the transformer 28 are connected in series with the primary windings of a plurality of transformers 35, 36 and 37 to one of the anodes of the group of arc discharge paths or valves 34. Similarly, each of the outer extremities of the secondary windings of the transformer 29 are connected in series with the primary windings of the transformers 38, 39 and 40 to one of the anodes of the groups of valves 34. The control circuit just described provides a means for producing substantially rectangular shaped alternating potentials. The positive portions of these rectangular shaped alternating potentials may be substantially shorter than the negative portions. Each of the transformers 35, 36, 37, 38, 39 and 40 is provided with a pair of primary windings, and a plurality of secondary windings which supply the substantially rectangular shaped alternating potentials to the control electrode of the groups of valves 17 and 18. The various arc discharge paths or valves 34 are controlled by a circuit energized from the secondary winding of the transformer 27 through a suitable phase shifting means 41 which supplies energy to the zigzag connected primary windings of a group of saturable control transformers 42 to 47. Each of these control transformers 42 to 47 is provided with a pair of secondary windings which are connected to the respective control electrodes or grids of the group of valves 34, and to the common cathode thereof through a suitable source of biasing potential 48. Each of these control transformers 42 to 47 is also provided with an auxiliary direct current winding which is energized through an adjustable resistor 49 from a suitable source of direct current 50 so that the saturation of these transformers may be varied thereby controlling the moments of ignition of the various arc discharge paths or valves 34.

In order periodically to render effective and ineffective, in accordance with the frequency of the alternating current output circuit 11, the application of the substantially rectangular shaped alternating potentials to the control electrodes or grids of the groups of valves 17 and 18 there is provided a control circuit including a transformer 51 energized from the output circuit 11. The secondary winding of the transformer 51 serves to energize a pair of arc discharge valves 52 and 53 having their anodes connected through output windings 54 and 55, respectively, to the outer extremities of the secondary winding of the transformer 51, and their cathodes connected to an intermediate point thereof through a smoothing reactor 56. A capacitor 57 connected across the secondary winding of the transformer 51 aids in the commutation of the current between the valves 52 and 53. The arc discharge valves 52 and 53 are provided with a control circuit which includes a saturable control transformer 58 energized from the alternating current circuit 11 through a suitable phase shifting circuit 59. The transformer 58 is furthermore provided with a direct current winding energized through an adjustable resistor 60 from the direct current source 50 for varying the saturation of the transformer so that the moments of ignition of the valves 52 and 53 may be controlled. Since both the control transformer 58 and the control transformers 42 to 47 of the group of valves 34 are saturable and are controlled by direct current from the source 50 it will be apparent that it is possible to obtain simultaneous control of the moments of ignition of these valves. The output windings 54 and 55 of the valves 52 and 53 comprise the primary windings of a transformer having a plurality of secondary windings 61 to 64 which serve as control transformers for a plurality of electron discharge valves 65 to 68, respectively. The anode of the valve 65 is connected through a suitable current limiting resistor 69 to the cathode of the group of valves 17, and the cathode of the valve 65 is connected through a resistor 70 to certain of the control electrodes of the group of valves 17. The anode of the valve 66 is connected to the cathode of the valve 65, and the cathode of the valve 66 is connected through a source of potential 71 to the cathode connection of the group of valves 17. These two valves 65 and 66 which are rendered conductive in accordance with the frequency of the conductivity of the valves 52 and 53 operate to alternately effectively connect one terminal of the secondary winding of the control transformer 38 to the cathode connection of one group of valves 17, and to periodically place a high negative bias upon certain control electrodes of the group of valves 17 due to the voltage drop appearing across the resistor 70 whenever the electron discharge valve 66 is rendered conductive. The anode of the valve 67 is connected through a suitable current limiting resistor 73 to the cathode connection of the other group of valves 18, and the cathode of the valve 67 is connected through resistor 74 to certain of the control electrodes of the group of valves 18. The anode of the valve 68 is connected to the cathode of the valve 67 and through the resistor 74 to the control electrodes of the group of valves 18. The cathode of the valve 68 is connected through a suitable source of potential 75 to the common cathode connection of the group of valves 18. These two groups of valves comprising the valves 65, 66 and 67, 68 serve to control the application of the substantially rectangular shaped alternating potentials to the control electrodes of the groups of valves 17 and 18, respectively. Each of these groups of valves is connected to control two of the secondary windings of each of the control transformers 35, 36, 37, 38, 39 and 40 which supply the substantially rectangular shaped alternating potentials to the groups of valves 17 and 18. For the purpose of simplicity in disclosure only one of the anodes and one of the control electrodes in each of the groups of valves 17 and 18 have been shown connected to their respective transformers, since it will be apparent to those skilled in the art that similar connections are to be made to the remaining anodes and control electrodes.

Since it is believed that the operation of the system will be apparent to those skilled in the art no detailed explanation thereof is believed to be necessary, but the operation may be summed up briefly as follows: The alternating current circuit 10, which for the purposes of explanation has been indicated as being the higher frequency circuit, supplies power to the transformer network having a primary winding 12 and a plurality of secondary windings 13, 14, 15 and 16 so that the anodes of the groups of valves 17 and 18 become energized in proper sequence. The control circuit for the control electrodes periodically supplies substantially rectangular alternating potentials to the groups of valves 17 and 18 alternately so that there is an alternate flow of power through the primary winding of the transformer 19 which supplies a lower frequency alternating power to the output circuit 11. The transformers 35 to 40 supply substantially rectangular shaped alternating potentials having a frequency equal to that of the input circuits and the transformers are energized from an electric valve converting system supplied by power from the transformer 27 which power is controlled by the group of valves 34 so that the duration of the positive and negative portions of the alternating potential supplied by these transformers may be controlled. These alternating potentials corresponding in frequency to the frequency of the input circuit are periodically and alternately applied to the groups of valves 17 and 18 by the alternate conductivity of the valves 65 and 67 and during the remaining period these potentials are rendered ineffective alternately due to the high negative bias placed upon the groups of valves 17 and 18 by the alternate conductivity of the valves 66 and 68. The valves 66 and 68 are preferably of the electron discharge type so that positive control may be had over both the starting and stopping of the conductivities of these valves.

By adjusting the resistor 49 which controls the degree of saturation introduced in the control transformers 42 to 47 the moments of ignition of the group of valves 34 may be retarded thereby decreasing the power output of the electric valve converting system interconnecting the two alternating current circuits and at the same time increasing the reactive power input. By adjusting the resistor 60 which controls the degree of saturation introduced into the control transformer 58 the power output of the electric valve converting system interconnecting the two alternating current circuits may be decreased and at the same time the reactive power input from the output circuit will be decreased. By simultaneously controlling the energy derived from the direct current source 50 the power output of the electric valve converting system may be controlled and at the same time there may be obtained any desired relation between the increases in the reactive power inputs to the converting system from the higher and lower frequency circuits.

For the purpose of providing a convenient illustration and explanation my invention has been shown as applied to an electric valve converting system operating between a polyphase higher frequency input circuit and a single phase lower frequency output circuit, but it will be understood that the invention is equally applicable to electric valve converting systems operating between alternating current circuits of any number of phases since, for example, the input circuit may be single phase and the output circuit may be polyphase. Furthermore, the input circuit may be of a lower frequency than the output circuit since that portion of the control circuit operating to render ineffective and effective alternately the application of the substantially rectangular alternating potential would be effective if the output frequency were greater than the input frequency.

While I have shown a particular application of my invention to an electric valve converting apparatus, it is to be understood that this is merely illustrative as one of the number of electric valve converting apparatus to which my invention may be applied and that I do not wish to be limited thereto, since it is apparent that the principles herein disclosed are susceptible to numerous other applications and modifications may be made in the arrangements to which my invention may be applied without departing from the spirit and scope of my invention as set forth in the appended claims.

What I claim as new and desire to secure by Letters Patent of the United States is:

1. The combination of an alternating current supply circuit having a certain frequency, a load circuit having a different frequency, an electric valve converting system interconnecting said circuits, said system including a plurality of arc discharge paths each provided with a control electrode, means for generating substantially rectangular shaped alternating potentials having a frequency corresponding to said input circuit, the positive portions of said potentials being substantially shorter than the negative portions, means for impressing said potentials upon said control electrodes, and means for periodically rendering ineffective said potentials in accordance with the frequency of said output circuit.

2. The combination of an alternating current supply circuit having a certain frequency, a load circuit having a different frequency, an electric valve converting system interconnecting said circuits, said system including a plurality of electric discharge paths each provided with a control electrode, means for generating substantially rectangular shaped alternating potentials having a frequency corresponding to said input circuit, means for impressing said potentials upon said control electrodes, and means for periodically applying in accordance with the frequency of said output circuit alternate positive and negative potentials upon said control electrodes.

3. The combination of an alternating current supply circuit having a certain frequency, a load circuit having a lower frequency, an electric valve converting system interconnecting said circuits, said system including a plurality of controlled arc discharge paths each having a control electrode, means for supplying to said control electrodes substantially rectangular shaped alternating potentials having a frequency corresponding to said supply circuit, and means for periodically rendering ineffective said alternating potentials at a frequency corresponding to that of said output circuit.

4. The combination comprising an electric valve converting system interconnecting an alternating current supply circuit and a load circuit each having different frequencies, said system including a plurality of electric discharge paths each controlled by a control electrode, means for generating substantially rectangular shaped alternating potentials having a frequency corresponding to said input circuit, means for impressing said potentials upon said control electrodes, means for periodically impressing in accordance with the frequency of said output circuit alternate positive and negative potentials upon said control electrodes, and means for simultaneously controlling the relative phase relation of all of the potentials impressed upon said control electrodes.

5. The combination of an electric valve converting system interconnecting an alternating current supply circuit having a certain frequency and a load circuit having a lower frequency, said system including a plurality of electric arc discharge paths each controlled by a control electrode, means for applying to said control electrode substantially rectangular shaped alternating potentials having a frequency corresponding to said input circuit, the positive portions of said potentials having a duration substantially equal to the conductive periods of said electric arc discharge paths, means for applying to said control electrodes alternating positive and negative potentials at a periodicity corresponding to the frequency of said output circuit, and means for controlling the power output of said system.

6. The combination of an alternating current supply circuit having a certain frequency, a load circuit having a different frequency, an electric valve converting system interconnecting said circuits, said system including a plurality of electric discharge paths each controlled by a control electrode, means for generating substantially rectangular shaped alternating potentials having a frequency corresponding to that of said input circuit, the positive portions of said potentials being substantially of shorter duration than the negative portions, means for impressing said potentials upon said control electrode, and means for periodically applying to said control electrodes potentials of such sign and magnitude as to periodically render ineffective said alternating potentials in accordance with the frequency of said output circuit.

7. The combination of an alternating current supply circuit having a certain frequency, a load circuit having a different frequency, an electric valve converting system interconnecting said circuits, said system including two groups of electric arc discharge valves, each valve thereof being provided with a control electrode, a control circuit for said electrodes including means for impressing upon said electrode an alternating potential having a frequency corresponding to that of said input circuit, and means for periodically maintaining nonconductive said groups of valves at a frequency corresponding to that of said output circuit comprising a source of alternating potential having a frequency corresponding to that of said output circuit, a pair of electric arc discharge valves energized from said source and provided with an output circuit, a pair of electron discharge valves for each group of said valves arranged to supply positive and negative potentials to the control electrodes thereof, and control circuits for said latter valves energized from the output circuit of said pair of electric arc discharge valves.

8. The combination of an alternating current supply circuit having a certain frequency, a load circuit having a different frequency, an electric valve converting system interconnecting said circuits, said system including two groups of electric arc discharge valves, each valve thereof being provided with a control electrode, means for supplying to said control electrode an alternating potential having a frequency corresponding to that of said input circuit, and means for periodically and alternately maintaining non-conductive the groups of valves at a frequency corresponding to that of said load circuit comprising a pair of electron discharge valves for each group of valves arranged to supply positive and negative potentials to the control electrodes thereof, control circuits for said latter valves comprising a pair of electric arc discharge valves having input and output circuits, said output circuits being arranged to energize the control electrodes of said electron discharge valves, said input circuit being energized from a source of alternating potential having a frequency corresponding to that of said load circuit.

9. The combination comprising an alternating current supply circuit having a certain frequency, an alternating current load circuit having a different frequency, an electric valve converting system interconnecting said circuit, said system including a group of electric arc discharge valves being provided with control electrodes, and a control circuit for said electrodes including means for supplying thereto an alternating potential having a frequency corresponding to said input circuit, a pair of electron discharge valves arranged to supply positive and negative potentials to said control electrodes at a frequency corresponding to the frequency of said load circuit, a control transformer for said latter valves, a pair of arc discharge valves arranged to control the energization of said transformer, a source of alternating potential for supplying energy to said latter valves, said source having a frequency corresponding to the frequency of said load circuit, and means for controlling the conductivities of said latter valves.

AUGUST SCHMIDT, Jr.